United States Patent [19]

Kitamura

[11] Patent Number: 4,733,999
[45] Date of Patent: Mar. 29, 1988

[54] CUTTING OIL SORTING APPARATUS

[75] Inventor: Koichiro Kitamura, Takaoka, Japan

[73] Assignee: Kitamura Machinery Co., Ltd., Tokyo, Japan

[21] Appl. No.: 941,183

[22] Filed: Dec. 12, 1986

[30] Foreign Application Priority Data

Dec. 16, 1985 [JP] Japan ................................ 60-281002

[51] Int. Cl.[4] .......................................... B23Q 11/10
[52] U.S. Cl. ...................................... 409/136; 408/61; 51/267; 82/32; 29/DIG. 87
[58] Field of Search ............... 210/168, 171, 196, 232, 210/416.5; 29/DIG. 50, DIG. 54, DIG. 61, DIG. 63, DIG. 65, DIG. 66, DIG. 76, DIG. 77, DIG. 79, DIG. 87; 407/11; 408/56, 57, 60, 61; 409/135, 136; 82/32, 34 R, DIG. 2; 51/267, 425

[56] References Cited

U.S. PATENT DOCUMENTS

| | | | |
|---|---|---|---|
| 2,434,679 | 1/1948 | Wagner et al. | 29/DIG. 87 |
| 4,095,916 | 6/1978 | Hammond | 408/59 |
| 4,197,678 | 4/1980 | Roll et al. | 29/DIG. 87 |
| 4,636,317 | 1/1987 | Lewis | 210/168 |

Primary Examiner—Richard V. Fisher
Assistant Examiner—Richard D. Jordan
Attorney, Agent, or Firm—Ronald P. Kananen

[57] ABSTRACT

In a machine tool including a spindle head (1), a XY-table (2) placed under the spindle head (1) and a base (A), and a cutting liquid sorting apparatus, the cutting liquid sorting apparatus includes a receiver (19), with an opening (21) at its bottom, for receiving water soluble cutting liquid and oily cutting liquid, a first tank (15) for containing the water soluble cutting liquid, a second tank (16) for containing the oily cutting liquid, an actuator (20) for moving the receiver (19) between a first position in which the water soluble cutting liquid flows from the receiver (10) into the first tank (15) through the opening (21) and a second position in which the oily cutting liquid flows from the receiver (19) into the second tank (16) through the opening (21). The actuator (20) moves the receiver (19) along rails (17,18) between the two positions.

4 Claims, 3 Drawing Figures

4,733,999

CUTTING OIL SORTING APPARATUS

BACKGROUND OF THE INVENTION

This invention relates to a cutting liquid sorting apparatus.

There are many kinds of cutting liquids for a machine tool which are water soluble cutting liquids and/or oily cutting liquids.

In the prior art, a machine tool is equipped with only one tank for receiving the cutting liquid and a single pump for pumping the cutting liquid within a base of the machine tool. Therefore, after the water soluble cutting liquid is used in a tank, it must be completely discharged so that the tank can be cleaned. After that, the oily cutting liquid can be used in the same tank. Also, after the oily cutting liquid is used in a tank, it must be completely cleaned so that the water soluble cutting liquid can be used in the same tank.

Accordingly, it takes a long time for cleaning the tank.

SUMMARY OF THE INVENTION

The object of this invention is to provide a cutting liquid sorting apparatus in which both of a water soluble cutting liquid and an oily cutting liquid can be simply used in a machine tool.

According to this invention, there is provided a cutting liquid sorting apparatus for a machine tool, comprising:
a receiver for receiving a water soluble cutting liquid and an oily cutting liquid;
a first tank for containing the water soluble cutting liquid;
a second tank for containing the oily cutting liquid;
the receiver having at its bottom an opening;
means for moving the receiver between a first position in which the water soluble cutting liquid flows from the receiver into the first tank through the opening and a second position in which the oily cutting liquid flows from the receiver into the second tank through the opening.

BRIEF DESCRIPTION OF THE PREFERRED EMBODIMENT

Figure 1:
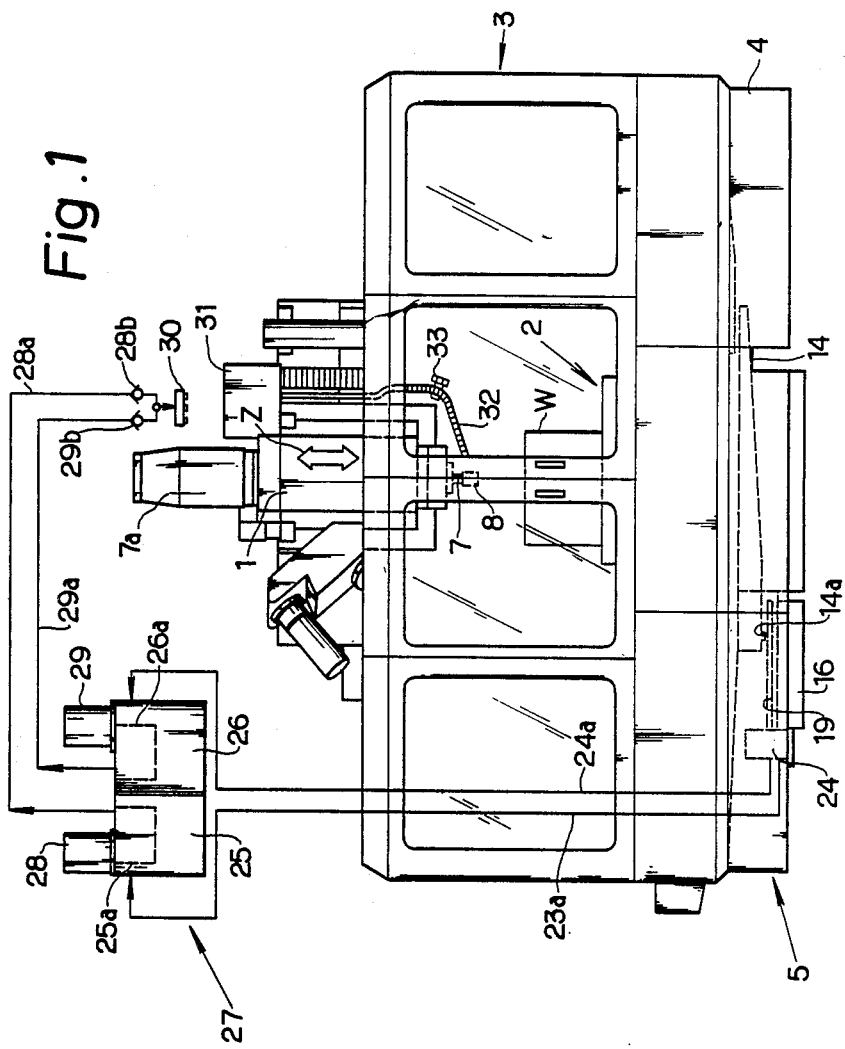
FIG. 1 is a front view showing a machine tool equipped with a cutting liquid sorting apparatus according to this invention.

A receiver 19 receives water soluble cutting liquid and oily cutting liquid after they are used in cutting of a work piece at a machine tool. The receiver 19 is formed in the shape of a dish or tray. The receiver 19 has an opening 21 at its bottom portion. A first tank 15 contains the water soluble cutting liquid. A second tank 16 contains the oily cutting liquid. Moving means such as an actuator 20 moves the receiver 19 between a first position in which the water soluble cutting liquid flows from the receiver 19 into the first tank 15 through the opening 21 and a second position in which the oily cutting liquid flows from the receiver 19 into the second tank 16 through the opening 21. Therefore, the water soluble cutting liquid and the oily cutting liquid can be contained in the first tank 15 and the second tank 16, respectively.

DETAILED DESCRIPTION OF THE PREFERRED EMBODIMENT

Figure 2:
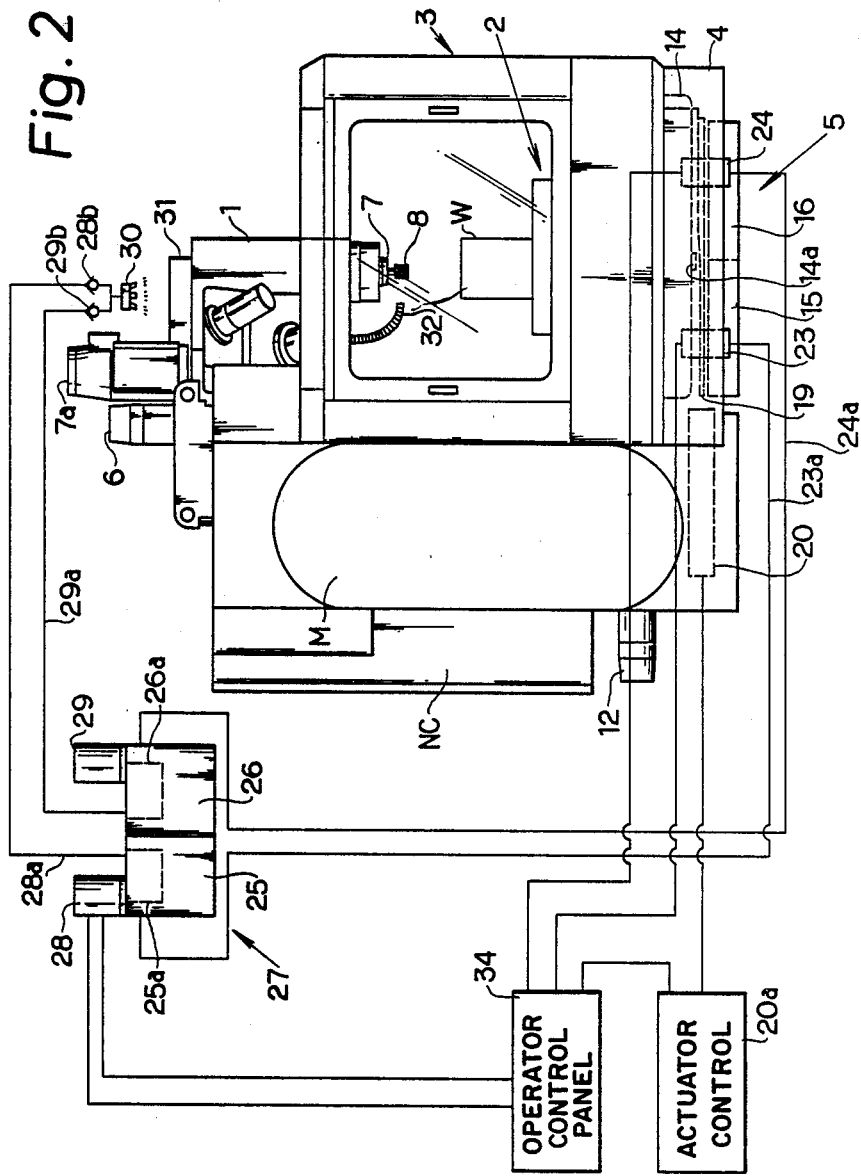
FIG. 2 is a side view showing the machine tool shown in FIG. 1.

Referring now to FIGS. 1 and 2, a machine tool includes a spindle head 1, a XY table 2 placed under the spindle head 1, a splash guard 3, a base 4, a cutting liquid sorting apparatus 5, a numerically-controlled machine NC and a tool magazine M. The spindle head 1 can move in the direction of the arrow Z by means of a motor 6. A spindle 7 attached to the spindle head 1 holds a tool 8. The spindle 7 can rotate by means of a motor 7a. A workpiece W is set on the XY table 2. The splash guard 3 covers the XY table 2, the tool 8 and others.

Figure 3:
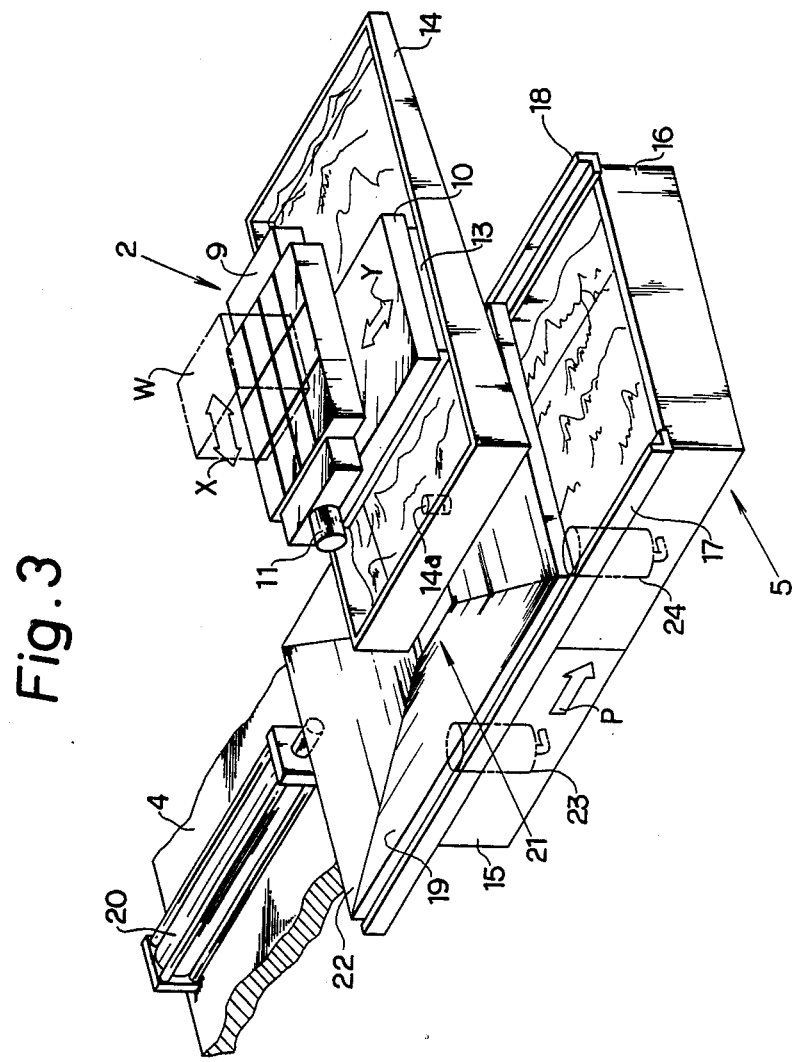
FIG. 3 is a perspective view showing the cutting liquid sorting apparatus shown in FIG. 1.

The cutting liquid sorting apparatus 5 is provided in the base 4 as best shown in FIG. 3.

As shown in FIG. 3, the XY table 2 has a first table 9 and a second table 10. The first table 9 can move in the direction of the arrow X by means of a servomotor 11. The second table 10 can move in the direction of the arrow Y by means of a servomotor 12 (FIG. 2). A support 13 for supporting the second table 10 is positioned in a tray 14. A base surface of the tray 14 is inclined so that a depth at one side of the tray 14 is deeper than that at the other side thereof. A discharge port 14a is formed in the bottom of the tray 14. A first tank 15 and a second tank 16 are arranged in a side by side manner below the tray 14. A pair of rails 17, 18 are arranged in parallel on a suporting means (not shown) so as to extend over the first tank 15 and the second tank 16. The receiver 19 can slidably move along the rails 17 and 18 in the direction of the arrow P when a rod of the actuator 20 is extended. Also, the receiver 19 can slidably move in the reverse direction when the rod of the actuator 20 is retracted. The actuator 20 can be a hydraulic cylinder means attached to the base 4.

The receiver 19 has at its bottom a rectangular opening 21 through which the cutting liquid can flow out.

If the receiver 19 moves to a first position by means of the actuator 20, the opening 21 is directly over the first tank 15 so that the cutting liquid received in the receiver 19 can flow into the first tank 15. If the receiver 19 moves to a second position by means of the actuator 20, the opening 21 is directly over the second tank 16 so that the cutting liquid received in the receiver 19 can flow into the second tank 16.

As shown in FIG. 2, a pump 23 is attached to the first tank 15. A pump 24 is attached to the second tank 16. The pump 23 is used to feed the water soluble cutting liquid from the first tank 15 into a main tank 25. The pump 24 is used to feed the oily cutting liquid from the second tank 16 to a main tank 26. A strainer (not shown) is placed at an entrance of each of the main pumps 23, 24.

The pump 23 is connected through a pump 23a to the main tank 25. The pump 24 is connected through a pipe 24a to the main tank 26. These main tanks 25, 26 constitute a main tank unit 27. A pump 28 is attached to the main tank 25. A pump 29 is attached to the main tank 26. The pump 28 is used to feed the water soluble cutting liquid received in the main tank 25 to a nozzle 30 by way of a pipe 28a and a check valve 28b. A pump 29 is used to supply the oily cutting liquid received in the main tank 26 to the nozzle 30 by way of a pipe 29a and a check valve 29b.

A tank 31 is placed directly under the nozzle 30. The tank 31 is detachably attached to the spindle head 1. An upper end portion of a flexible hose 32 is joined to the tank 31. A lower end portion of the flexible hose 32 is placed so as to face the tool 8. A valve 33 is provided at an intermediate portion of the flexible hose 32.

The first tank 15 and the main tank 25 are used to contain the water soluble cutting liquid. The second tank 16 and the main tank 26 are used to contain the oily cutting liquid.

The pumps 23, 24, 28, 29 are electrically connected to an operator control panel 34 as shown in FIG. 2. An actuator control means 20a for actuating the actuator 20 is electrically connected to the operator control panel 34.

In operation, the water soluble cutting liquid or the oily cutting liquid is selected in view of machining conditions such as tool materials, machining requirements, work materials or the like.

If the water soluble cutting liquid is selected, it is contained in the main tank 25 of the main tank unit 27. According to the control signals from the operator control panel 34, the pump 28 starts. The water soluble cutting liquid is introduced by way of the pipe 28a, the check valve 28b and the nozzle 30 into the tank 31. When the valve 33 is open, the water soluble cutting liquid is discharged from a tip of the flexible hose 32 to the tool 8. The spindle head 1 moves down while the tool 8 rotates whereby the work piece W is cut. The water soluble cutting liquid flows into the tray 14 together with the chips and dusts as best shown in FIG. 3.

The actuator 20 is in a contracted position according to the control signals from the operator control panel 34. The opening 21 of the receiver 19 is directly over the first tank 15. The water soluble cutting liquid is discharged through the discharge port 14a of the tray 14 and received by the receiver 19, and then introduced into the first tank 15 through the opening 21. The pump 23 continues to operate according to the control signals from the operator control panel 34. The pump 29 for the main tank unit 27 and the second pump 24 for the second tank 16 do not operate. The water soluble cutting liquid in the first tank 15 is fed by way of the tube 23a into the main tank 25 of the main tank unit 27.

The water soluble cutting liquid including the dust or chips flows through a strainer unit 25a placed in the main tank 25. At that time, the dust or chips are removed by the strainer unit 25a. After that, the water soluble cutting liquid is fed to the nozzle 30 by means of the pump 28 and then received in the tank 31.

The water soluble cutting liquid is circulated in the above-mentioned manner.

If the cutting operation is finished, the tool 8 stops and the spindle head 1 moves up.

If the oily cutting liquid is selected, it is contained in the tank 31. The pumps 23, 28 stop according to the control signals from the operator control panel 34. The pumps 24 and 29 start according to the control signals from the operator control panel 34. The actuator 20 is in its extended condition according to the control signals from the operator control panel 34. The receiver 19 has moved in the direction of the arrow P so that the opening 21 is directly over the second tank 16.

The oily cutting liquid in the main tank 26 is supplied through the pipe 29a, the check valve 29b and the nozzle 30 to the tank 31 by means of the pump 29. The oily cutting liquid is discharged onto the tool 8 through the tip of the flexible hose 32. The spindle head 1 moves down so as to cut the workpiece W. The oily cutting liquid including dust or chips flows into the tray 14. After that, the oily cutting liquid is discharged through the discharge port 15 and received by the receiver 19 and then introduced into the second tank 16 through the opening 21.

The oily cutting liquid in the second tank 16 returns to the main tank 26 of the main tank unit 27 through the pipe 24a by means of the pump 24. The oily cutting liquid in the main tank 26 flows through the strainer unit 26a so that the dust and chips can be separated from the liquid. The oily cutting liquid in the main tank 26 is again fed to the tank 31 through the pipe 29a and the valve 30 by means of the pump 29.

The oily cutting liquid is circulated in the above-mentioned manner. If the machining operation is finished, the tool 8 stops and the spindle head 1 moves up.

This invention is not limited to the above-mentioned embodiment. For example, the receiver 19 can be manually operated.

I claim:

1. A machine tool including a spindle head (1), a XY-table (2) placed under the spindle head (1) and a base (4), and a cutting liquid sorting apparatus, the cutting liquid sorting apparatus comprising:
    a tray (14) having at its bottom a discharge port (14a);
    a support (13) placed in the tray (14) for supporting the XY table (2);
    a receiver (19) having a means defining an opening (21) at its bottom and formed in the shape of a dish for receiving water soluble cutting liquid and oily cutting liquid from the discharge port (14a) of the tray (14);
    a first tank (15) for containing the water soluble cutting liquid;
    a second tank (16) for containing the oily cutting liquid, the first tank (15) and the second tank (16) being arranged in a side-by-side manner;
    a pair of rails (17, 18) arranged over the first and second tanks (15, 16); and
    a hydraulic cylinder type actuator (20) for moving the receiver (19) slidably along the rails (17, 18) between a first position in which the water soluble cutting liquid flows from the receiver (19) into the first tank (15) through the opening (21) and a second position in which the oily cutting liquid flows from the receiver (19) into the tank (16) through the opening (21).

2. The machine tool of claim 1, wherein the hydraulic cylinder type actuator (20) is attached to the base (4) and has a rod which is retracted or extended.

3. The machine tool of claim 1, wherein the spindle head (1) is moved by a motor (6) in a vertical direction and is equipped with a spindle (7) to which a tool (8) is attached so that the tool (8) can move together with the spindle head (1) and the spindle (7) in the vertical direction.

4. The machine tool of claim 3, further comprising:
    a third tank (25) connected to the first tank (15) for receiving the water soluble cutting liquid from the first tank (15);
    a fourth tank (26) connected to the second tank (16) for receiving the oily cutting liquid from the second tank (16);
    a nozzle (30) connected to both the third and fourth tanks (25, 26) so as to receive either the water soluble cutting liquid from the first tank (15) or the oily cutting liquid from the second tank (16);

a fifth tank (31) placed under the nozzle (30) and detachably attached to the spindle head (1) so as to receive the cutting liquid from the nozzle (30); and a hose (32) connected to the fifth tank (31) for feeding the cutting liquid to the tool (8) in such a way that the spindle head (1) can move together with the fifth tank (31) and the hose (32).

* * * * *